Patented July 26, 1949

2,477,311

UNITED STATES PATENT OFFICE 2,477,311

LUBRICATING GREASE COMPOSITIONS

Arnold J. Morway, Clark, N. J., assignor to Standard Oil Development Company, a corporation of Delaware No Drawing. Application November 29, 1946, Serial No. 713,113

4 Claims. (Cl. 252—30)

The present invention relates to lubricating grease compositions and particularly to greases which are designed to resist high temperature and adhere to metallic surfaces in the presence of moisture and under widely varying temperature conditions.

In particular this invention relates to a grease of the lubricating oil and carbon black type adapted for use for lubricating large spur gears and other types of rough machine gears, such as those which are too large to be fully enclosed in gear cases and which for this reason cannot be lubricated with oil. The grease of the present invention is adapted for use in numerous applications where there is a requirement for moisture-resisting properties and where it is desired that the grease remain on the parts to be lubricated under extreme conditions of hot and cold temperatures.

In the past, large exposed gears have commonly been lubricated with heavy tarry greases such as heavy asphaltic cutbacks. At normal temperatures such materials are usually satisfactorily adhesive and they are water insoluble. Their lubricating properties, however, are not all that might be desired and frequently gears lubricated with such compositions are subject to considerable wear, especially when their teeth are not accurately machined. In addition, lubricants of the heavy asphaltic type have widely different properties at high and low temperatures. Under high temperature conditions such lubricants melt and run off the gear teeth, leaving their surfaces exposed and subject to rapid wear. In cold weather such compounds become excessively hard and brittle and frequently chip and flake away from the gear teeth. In either case the parts to be lubricated are left unprotected.

Another disadvantage of the asphaltic type lubricants mentioned above is that they must be heated for application to metal parts in cold weather. Since their specific heat content is relatively low, they frequently congeal rapidly even when heated and thus fail to reach the parts requiring lubrication, and the difficulty of heating and applying them suitably is in itself a major objection to their use.

Accordingly it is an object of the present invention to compound a grease which will be free of the above-mentioned objectionable characteristics and which at the same time is relatively inexpensive, easy to apply and adequately adherent to the parts to be lubricated.

Another object of the invention is to produce in a novel and advantageous manner greases having the desirable characteristics just mentioned.

Still another object is to compound a unique gear grease having exceptionally high temperature properties, a good degree of insolubility in water and good adhesiveness to metals.

Other objects will be self-evident as this description proceeds.

In the prior art there have been filed certain applications, of which application Serial No. 570,783, filed December 30, 1944 (now abandoned), is exemplary, wherein use is made of the properties of certain carbon blacks to impart a grease-like structure to lubricants. These carbon blacks have been referred to as "structural" carbon blacks and are exemplified by the acetylene blacks and the channel blacks of smaller particle sizes. When such carbon blacks are incorporated in lubricating oil they impart a colloidal structure to the composition which is quite similar in many respects to the well-known soap grease structure of conventional grease type lubricants. The structural blacks, so-called, may comprise acetylene blacks having a pH value of about 8 and having a particle size of the order of 7 acres per pound of black. The channel blacks, which also may be considered in this category, may be those having a pH value from 9 down to perhaps 4 and having a particle size which gives them a surface area of the order of 6 to 32 acres per pound.

Apparently those types of carbon black which are herein referred to as structural have either a particulate or reticulate structure, that is the small particles of carbon, having average diameters of the order of 10 to 50 millimicrons, tend to group in clusters or chains. Channel blacks are particulate and their grease structure forming properties depend on their high oil absorption due to small particle size. Acetylene black is reticulate in particle structure and has abnormal oil absorptive and structure forming properties. The acetylene blacks appear in the form of groups of particles in branched chains giving a reticulate or lacy structure which can be detected by means of the electron microscope and which is particularly suitable for the setting up of a good grease structure. The carbon blacks of smaller particle size, such as the channel blacks mentioned above, commonly produce a particulate as distinguished from a reticulate or branched structure. In particulate blacks a number of the small individual particles group together in clusters which, while not as well adapted to forming a grease structure as the reticulate form of carbon, are nevertheless fairly suitable for this purpose. For the purposes of the present invention these carbon blacks are grouped together and referred to generally as structural carbon blacks. Reference is made hereinafter to various types of structural blacks such as acetylene black, the carbon black known commercially as Monarch 71 which is a typical ink black, and the like.

I have discovered that a grease compounded of a mineral lubricating oil, for example a mid-continent base oil conventionally refined, having a viscosity of 180 S. S. U. at 210° F., when thoroughly mixed with a structural carbon black, preferably acetylene black, forms a good lubricant of excellent consistency, but is not entirely suitable for use on exposed rough gearing because it lacks certain adhesive qualities. When there are added to such a composition materials which improve its adhesiveness to metal surfaces, the structural carbon black grease is found to be highly suitable for the purposes referred to above. Thus, if a small percentage of a high molecular weight polyisobutylene is incorporated in the carbon black grease, its adhesiveness is considerably improved. Unfortunately, however, polyisobutylene of this character, when used in quantities adequate to impart a high degree of adhesiveness to the grease, is unstable to shearing action which occurs at the meshing surfaces of the gears. These compounds soon break down in viscosity and lose much of their adhesive characteristics. Asphalt has been tried for the same purpose but this material causes the carbon black to lose its bodying properties in the grease. Such a composition becomes fluid and is not suitable for the purposes referred to hereinabove.

I have found that when petroleum hydrocarbon resins obtained from the propane extraction of deasphaltized petroleum oil residuums are used as tackiness agents, they impart an excellent quality of cohesiveness and adhesiveness to the carbon black grease mentioned above. They also improve the resistance of the grease to hot water, even to hot water which is poured over the grease in a stream. These petroleum resins have high viscosities and high viscosity indices. Thus, at temperatures of 210° F. their viscosity commonly ranges from 900 to 8000 S. S. U. These materials per se are well-known and are described in some detail by Groff and Forrest in Industrial and Engineering Chemistry, vol. 32, No. 3, pages 294 and 298 (March 1940).

When petroleum hydrocarbon resins of the character just mentioned are added to structural carbon black greases comprising mineral oil and acetylene or other structural blacks of the types mentioned above, they render a lubricant quite satisfactory for the lubrication of exposed rough gears under various extremes of temperature and under severe moisture conditions. They do not adversely affect the grease-forming characteristics of the carbon black to any notable extent and they appear to be unaffected by high rates of shear. Unlike the polybutene polymers mentioned above, they do not break down under high shear conditions such as those that occur in the meshing gear teeth, and they appear to be superior in some other respects. Furthermore, high concentrations of the resins may be employed while if more than 0.2 to 0.3% of high molecular weight polybutene is employed, the grease would become so cohesive that it would be difficult to apply and when applied could be peeled from the metal surfaces quite readily and completely.

In some of the compositions of the present invention it is considered desirable, though not essential, to employ, in addition to the petroleum resins, small quantities of polybutene in the grease. The character of the adhesiveness imparted to the lubricant by the polybutene constituents is somewhat different from that imparted by the petroleum resins and both properties are desirable in certain respects or for certain purposes.

A typical formula for a satisfactory grease of the general type mentioned above is as follows:

| | Per cent |
|---|---|
| Acetylene black | 12.0 |
| Flowers of sulfur | 2.0 |
| Polyisobutene polymer concentrate (approximately 6 to 7% of high molecular weight polyisobutylene (60,000–80,000 mol. wt.) in mineral oil) | 1.0 |
| Petroleum resin from bright stock (5000 S. S. U. at 210° F.) | 20.0 |
| Conventionally refined Mid-Continent oil of 180 S. S. U. viscosity at 210° F. | 65.0 |

The acetylene black is charged to a grease kettle with about one-half of the mineral oil, and agitation is started. As the mass begins to thicken, the balance of the mineral oil is run into the kettle and the grease is worked to a smooth homogeneous mass before the petroleum resin is added. The resin is next worked thoroughly into the composition and finally the polybutene concentrate and the sulfur are added and thoroughly incorporated into the mixture.

A grease prepared as above is found to have a penetration measure of 300, no dropping point or melting point at any reasonable temperature, and it is found to have fairly high extreme pressure properties. Thus, such a grease is found to carry 15 weights both in gradual and in shock loading on the Almen test machine.

In a practical test of a grease compounded as above, the teeth of a gear were coated with a thin layer and the gear then rotated at 210 R. P. M. It was found that the grease worked and spread over the surface of the gear teeth quite thoroughly and was very adhesive to the metal. As the teeth of the gear were meshed with another gear, the grease was found to become fluid at the point of contact. However, due to the thixotropic nature of the grease, it immediately thickened after removal of the pressure, regaining its original consistency. After twenty-four hours continuous running, no bare spots were noted on the gear teeth. When the gear was stopped, no dripping of the grease occurred and no separation of the oil from the thickeners was noted.

Comparative tests were conducted between several greases of related composition by spreading them out on a flat surface and playing a stream of hot water (about 152° F.) under pressure over the greases. The greased surface was inclined and the test was continued for a period of ten minutes. The following examples give the compositions tested and the results of the water-washing tests.

*Example I*

| | Percent |
|---|---|
| Acetylene black | 12.0 |
| Sulfur | 2.0 |
| Polyisobutene concentrate (same as in typical formula given above) | 1.0 |
| Conventionally refined mineral oil of 180 S. S. U. at 210° F. | 85.0 |

At the end of the test period a thin dry film of black grease covered most of the surface, although some parts were found to be completely bare.

*Example II*

|  | Percent |
|---|---|
| Acetylene black | 12.0 |
| Sulfur | 2.0 |
| Polyisobutene concentrate | 1.0 |
| Heavy asphaltic cutback, viscosity 260 S. S. U. at 210° F. | 85.0 |

This grease is semi-fluid and flows at ordinary temperatures. Because of the asphaltic content combined with the acetylene black it has no true grease structure. Under the water washing test, however, a thin film of oily black grease remained on the metal surface, no bare spots appearing. Over a period of time this grease drips off the gearing to a large extent.

*Example III*

|  | Percent |
|---|---|
| Acetylene black | 12.0 |
| Sulfur | 2.0 |
| Polyisobutene concentrate | 1.0 |
| Petroleum resin | 20.0 |
| Mineral oil of 180 S. S. U. at 210° F. | 65.0 |

Under the same test conditions a thin film of oily black grease remained on the metal surface after ten minutes with no bare spots appearing. This composition is not fluid and does not run off the surface it is designed to protect.

*Example IV*

A good commercial grade of sodium-soap-compounded grease prepared especially for open gear lubrication was tested under the same conditions and by the end of ten minutes all the grease was completely washed off the surface. A typical composition is as follows:

|  | Percent |
|---|---|
| Sodium soap of hydrogenated fish oil acids | 11.80 |
| Lead oleate | 7.15 |
| Asphaltic type mineral oil distillate | 10.0 |
| Asphaltic type mineral oil residuum | 69.05 |
| Flowers of sulfur | 2.00 |

From the foregoing examples it is evident that carbon black greases without petroleum resins are not highly resistant to the water washing test. Commercial grades of sodium-soap-compounded gear greases are inferior even to the acetylene black greases without petroleum resin. The grease of Example III which included petroleum resins was fully as good in water resisting properties as the heavy asphaltic cutback grease of Example II and had the advantage of retaining a true grease structure, whereas the grease of Example II flowed and dripped off the gears at ordinary temperatures. Examples I and IV were quite unsatisfactory in resistance to water.

While I have given specific examples of ingredients which may be combined to form a highly satisfactory grease composition, it will be understood that any other structural blacks, including the channel blacks of smaller particle size, may be substituted for acetylene black. The percentages used may be varied considerably. Likewise, the particular petroleum resin used may be varied within limits, although I prefer to use those resins having a viscosity of 500 to 10,000 S. S. U. at 210° F. and preferably having a viscosity between 900 and 5000 at the same temperature. The isobutylene polymer may be omitted, but preferably it is included in quantities of 0.05 to 0.3%.

Thus, the composition may include from 60 to 90% mineral oil, 2 to 20% carbon black and 1 to 30% petroleum resin together with a small percentage, preferably 0.1 to 5%, of sulfur. A preferred composition will consist of from 65 to 85% of a mineral base lubricating oil, 10 to 15% of a structural carbon black which is preferably acetylene black although not necessarily so, 15 to 25% of a petroleum resin having a viscosity between 500 and 10,000 S. S. U. at 210° F., 0.5 to 5% sulfur and from 0.05 to 0.3% of a polymerized hydrocarbon tackiness agent such as polyisobutylene of high molecular weight (50,000 to 80,000 mol. wt.).

As indicated above, the preferred process is to stir the carbon black into about one-half of the mineral oil, adding the remainder of mineral oil during the stirring and continuing the stirring to form a substantially homogeneous mass. Thereafter the petroleum resin is added and worked into the mass, and still later the desired percentages of flowers of sulfur and of polybutene (if used) are added, the whole being thoroughly worked to a uniform consistency. It will be apparent that these steps may be varied somewhat but, generally speaking, it is important to obtain the grease structure set-up between the oil and the carbon before the other ingredients are added.

From the foregoing it will be evident that the advantages of structural carbon black greases are obtained in combination with the advantages of the tacky compositions required for use on exposed gearing. While I have described the grease composition of my invention as being particularly adapted for use on exposed gearing, it will be understood that it is useful also for many types of lubrication under varying conditions. It is particularly free from objectionable changes in consistency under extreme temperature changes, remaining fairly firm but sufficiently plastic to afford ease of dispensing and application over a wide range of temperatures, as from 15° F. up to 120° F., or more, and good lubrication from 0° to 300° F. The properties appear to be such that the grease is suitable for uses at higher and lower temperatures than those just mentioned.

Having described my invention, I desire to make it clear that its scope is not to be limited by the foregoing description or otherwise except as required by the following claims:

I claim:

1. A lubricating grease composition comprising 60 to 90% mineral oil, 2 to 20% structural carbon black, selected from the group consisting of acetylene black and channel black of 10 to 50 millimicrons average diameter of abnormally high oil absorptive properties 1 to 30% petroleum resin obtained by propane extraction of deasphaltized petroleum residuums, said resin having a viscosity between 500 and 10,000 S. S. U. at 210° F. and 0.1 to 5% of sulfur.

2. A lubricating grease composition comprising a major proportion of lubricating oil, from 2 to 20% acetylene carbon black, 1 to 30% petroleum resin obtained by propane extraction of deasphaltized petroleum residuums, said resin having a viscosity between 500 and 10,000 S. S. U. at 210° F. and 0.1 to 5% sulfur.

3. A lubricating grease composition comprising approximately 65% mineral lubricating oil, 12% acetylene black, 2% sulfur, 20% petroleum resin obtained by propane extraction of deasphaltized petroleum residuums and 0 to 0.3% of a polyisobutylene of 50,000 to 80,000 molecular weight.

4. A lubricating composition comprising about 65 to 85% of a mineral base lubricating oil, 10 to 15% of acetylene carbon black, 15 to 25% of a petroleum resin obtained by propane extraction of deasphaltized petroleum residuums having a viscosity of approximately 500 to 10,000 S. S. U. at 210° F., 0.5 to 5% of sulfur, and from 0 to 0.3% of a polymerized olefinic hydrocarbon of 50,000 to 80,000 molecular weight as a tackiness agent.

ARNOLD J. MORWAY.

REFERENCES CITED

The following references are of record in the file of this patent:

UNITED STATES PATENTS

| Number | Name | Date |
|---|---|---|
| 317,490 | Belknap | May 12, 1885 |
| 1,186,167 | Bierbaum | June 6, 1916 |
| 2,151,585 | Buxbaum | Mar. 21, 1939 |
| 2,323,360 | Wallace | July 6, 1943 |
| 2,339,898 | White | Jan. 25, 1944 |
| 2,341,134 | Adams | Feb. 8, 1944 |
| 2,349,058 | Swenson | May 16, 1944 |
| 2,356,367 | Wright | Aug. 22, 1944 |

OTHER REFERENCES

"Uses and Applications of Chemicals and Related Materials," Reinhold Pub. Corp., New York, N. Y., 1939, Thomas C. Gregory, lines 8-4 from the bottom of column 2, page 148.

"Canadian Chemicals and Metals," vol. 17, May 1933; article by Kaufman entitled "Acetylene carbon black," pages 93 to 95.